United States Patent
Hirai et al.

(10) Patent No.: US 8,456,849 B2
(45) Date of Patent: Jun. 4, 2013

(54) CONDUCTIVE FILM STACKED MEMBER, ELECTRO-OPTICAL DEVICE, AND ELECTRONIC APPARATUS

(75) Inventors: Toshimitsu Hirai, Hokuto (JP); Eiji Okamoto, Matsumoto (JP); Kohei Ishida, Suwa (JP)

(73) Assignee: Seiko Epson Corporation (JP)

( * ) Notice: Subject to any disclaimer, the term of this patent is extended or adjusted under 35 U.S.C. 154(b) by 262 days.

(21) Appl. No.: 12/848,453

(22) Filed: Aug. 2, 2010

(65) Prior Publication Data

US 2011/0063782 A1    Mar. 17, 2011

(30) Foreign Application Priority Data

Sep. 15, 2009   (JP) .................. 2009-213008

(51) Int. Cl.
*H05K 7/00*  (2006.01)
(52) U.S. Cl.
USPC .......................................................... 361/735
(58) Field of Classification Search
USPC .... 361/735, 725, 733, 771, 772, 790; 257/40, 257/59, 66, 72, 98; 174/261, 524, 527
See application file for complete search history.

(56) References Cited

U.S. PATENT DOCUMENTS

| 5,498,573 | A | * | 3/1996 | Whetten ................... 438/644 |
| 6,715,871 | B2 | | 4/2004 | Hashimoto et al. |
| 7,169,710 | B2 | | 1/2007 | Yamazaki et al. |
| 7,884,369 | B2 | | 2/2011 | Yamazaki et al. |

FOREIGN PATENT DOCUMENTS

| JP | 2003-80694 | 3/2003 |
| JP | 2009-088537 | 4/2009 |
| JP | 2009-200312 | 9/2009 |

* cited by examiner

*Primary Examiner* — Jeremy Norris
*Assistant Examiner* — Tremesha S Willis
(74) *Attorney, Agent, or Firm* — Harness, Dickey & Pierce, P.L.C.

(57) ABSTRACT

A conductive film stacked member includes: a first conductive film formed on a substrate; and a second conductive film formed on the first conductive film, wherein the width of the second conductive film is narrower than the width of the first conductive film, and the second conductive film has a surface convexly curved in the direction away from the first conductive film in a cross-sectional view.

9 Claims, 13 Drawing Sheets

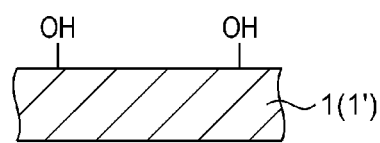
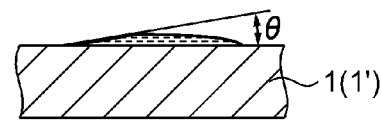
FIG.12A          FIG.12B
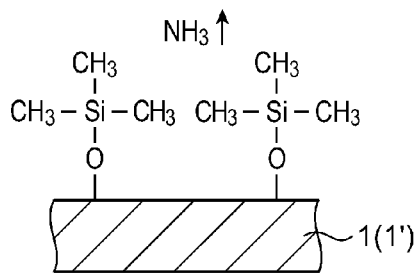
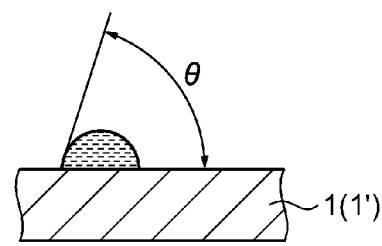
FIG.12C          FIG.12D

CONDUCTIVE FILM STACKED MEMBER, ELECTRO-OPTICAL DEVICE, AND ELECTRONIC APPARATUS

The entire disclosure of Japanese Patent Application No. 2009-213008, filed Sep. 15, 2009 is expressly incorporated by reference herein.

BACKGROUND

1. Technical Field

The present invention relates to a conductive film stacked member, an electro-optical device, and an electronic apparatus.

2. Related Art

As a known method for forming a patterned film, such as a conductive film, on a substrate, an inkjet method or any other suitable method is used to discharge droplets made of a liquid material containing the material of the patterned film so that a functional liquid formed of successive droplet dots is applied onto the substrate, and solidify the applied functional liquid so that the patterned film is formed (see JP-A-2003-080694, for example).

Since the patterned film formed by using the method described above is, however, formed of aggregated tiny dots overlapping with each other, steps are disadvantageously created in the patterned film because the dots overlap with each other. When an external force is applied to the thus formed patterned film, stress concentration occurs at the steps, disadvantageously resulting in separation of the patterned film, and cracking and other defects in the patterned film.

SUMMARY

An advantage of some aspects of the invention is to solve at least part of the problem described above and the invention can be implemented as the following embodiments or application examples.

FIRST APPLICATION EXAMPLE

A conductive film stacked member according to a first application example includes a first conductive film formed on a substrate and a second conductive film formed on the first conductive film. The width of the second conductive film is narrower than the width of the first conductive film, and the second conductive film has a surface convexly curved in the direction away from the first conductive film in a cross-sectional view.

According to the configuration described above, since the second conductive film has a shape that does not come into contact with the substrate or overlap with both ends of the first conductive film, the occurrence of film separation or other defects due to stress or other reasons will be suppressed. Further, since the second conductive film has a surface convexly curved in the direction away from the first conductive film, the occurrence of cracks or other defects due to stress or other reasons will be suppressed.

SECOND APPLICATION EXAMPLE

The conductive film stacked member of the above application example may be configured such that the width of the second conductive film is narrower than the width of the first conductive film in such a way that both ends of the second conductive film are spaced apart from both ends of the first conductive film in the width direction by 0.5 to 5 μm.

According to the configuration described above, separation of the second conductive film, cracking, or other defects will not occur, whereby a reliable conductive film stacked member can be provided.

THIRD APPLICATION EXAMPLE

The conductive film stacked member of the above application example may be configured such that the thickness of the second conductive film ranges from 0.2 to 2 μm and the angle of each end of the second conductive film in a cross-sectional view ranges from 0.5 to 10 degrees.

According to the configuration described above, film separation, cracking, or other defects will be suppressed, whereby a reliable conductive film stacked member can be provided.

FOURTH APPLICATION EXAMPLE

The conductive film stacked member of the above application example may be configured such that the first conductive film is a conductive film having transparency and the second conductive film is a conductive film containing silver.

According to the configuration described above, since a silver-containing conductive film is stacked on a conductive film having transparency, the electrical resistivity can be reduced as the entire stacked conductive film, for example, even when the electrical resistivity of the first conductive film is relatively high, because the second conductive film containing silver is formed on the first conductive film.

FIFTH APPLICATION EXAMPLE

The conductive film stacked member of the above application example may be configured such that the conductive film stacked member further includes a protective film formed on the first and second conductive films and that the conductive film stacked member is formed of a three-layer stacked portion in which the first conductive film, the second conductive film formed on the first conductive film, and the protective film formed on the second conductive film are stacked and a two-layer stacked portion in which the first conductive film and the protective film formed on the first conductive film are stacked and which is located at each end in the width direction of the first conductive film.

According to the configuration described above, the surface of the second conductive film is covered with the protective film in the three-layer stacked portion. Further, since the first conductive film is closely contact with the protective film in the two-layer stacked portion, the second conductive film is reliably encapsulated. As a result, the second conductive film is reliably protected from an external environment.

SIXTH APPLICATION EXAMPLE

The conductive film stacked member of the above application example may be configured such that the first conductive film and the protective film are made of the same material.

According to the configuration described above, the adhesion between the first conductive film and the protective film can be further improved.

SEVENTH APPLICATION EXAMPLE

The conductive film stacked member of the above application example may be configured such that the second conductive film is formed by carrying out a water repellency treatment on the surface of the substrate, carrying out a weak water repellency treatment that provides water repellency weaker than that of the substrate on the surface of the first conductive film, and applying a liquid material containing the material of the second conductive film onto the first conductive film.

According to the configuration described above, the thus formed second conductive film has a width narrower than the width of the first conductive film and a surface convexly curved in the direction away from the first conductive film, whereby the occurrence of film separation or cracking due to stress or other reasons will be suppressed.

EIGHTH APPLICATION EXAMPLE

An electro-optical device according to an eighth application example includes any of the conductive film stacked members described above.

According to the configuration described above, an electro-optical device including a reliable conductive film stacked member can be provided. In this case, the electro-optical device corresponds, for example, to a liquid crystal display, a plasma display, an organic EL display, and an FED (Field Emission Display).

NINTH APPLICATION EXAMPLE

An electronic apparatus according to a ninth application example includes the electro-optical device described above.

According to the configuration described above, an electronic apparatus including a reliable electro-optical device can be provided. In this case, the electronic apparatus corresponds to a television receiver, a personal computer, a mobile electronic apparatus, and any other variety of electronic products in which a color filter, a plasma display, an organic EL display, or an FED (Field Emission Display) is incorporated.

BRIEF DESCRIPTION OF THE DRAWINGS

The invention will be described with reference to the accompanying drawings, wherein like numbers reference like elements.

FIGS. 12A to 12D are schematic views showing the base member that has undergone surface treatment.

DESCRIPTION OF EXEMPLARY EMBODIMENTS

Figure 1:
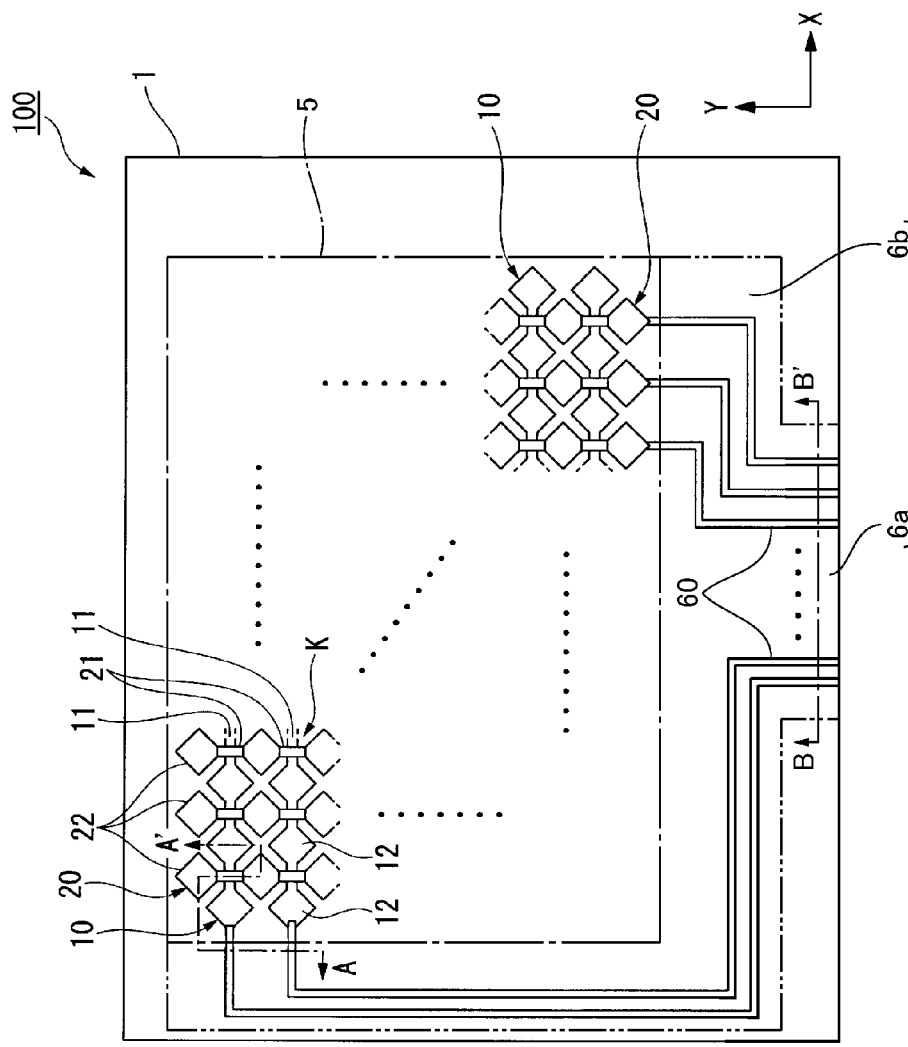
FIG. 1 is a plan view showing the configuration of a touch panel as a conductive film stacked member.

An embodiment in which the invention is implemented will be described below in detail with reference to the drawings. The scale, quantity and other attributes of each member in the drawings may be changed in order to show the member at a recognizable size in the drawings.

Configuration of Conductive Film Stacked Member

Figure 2:
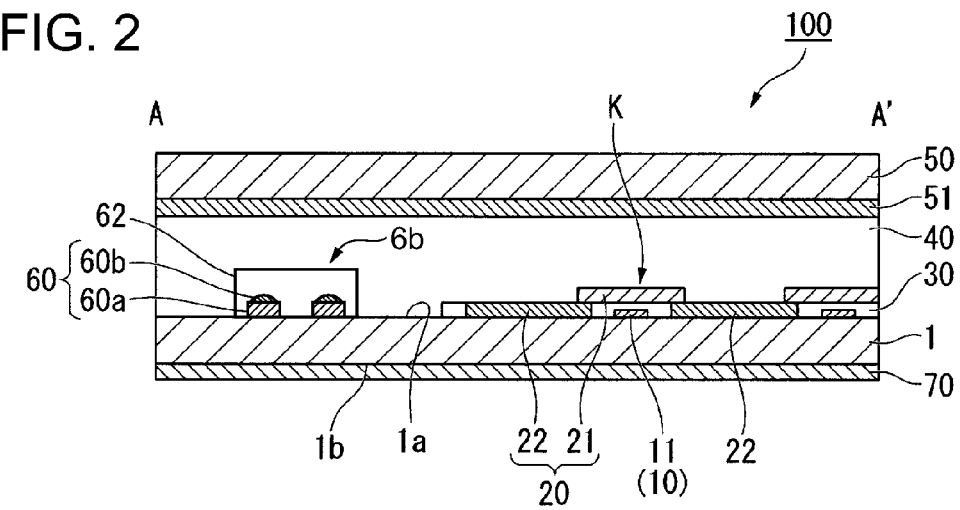
FIG. 2 is a cross-sectional view showing the configuration of the touch panel as a conductive film stacked member.
Figure 3A:
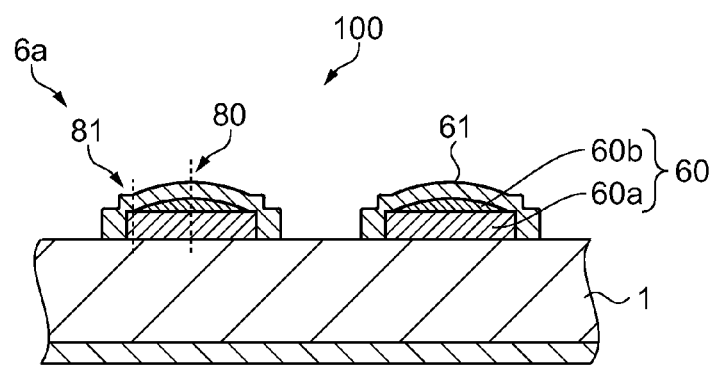
FIGS. 3A and 3B are cross-sectional views showing the configuration of the touch panel as a conductive film stacked member.
Figure 3B:
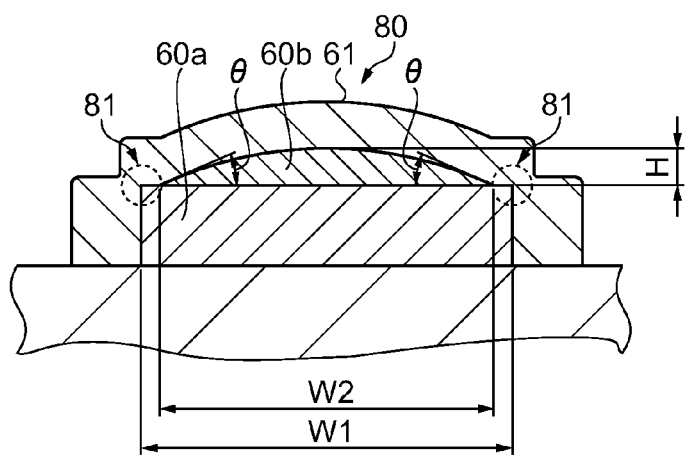

The configuration of a conductive film stacked member will first be described. In the present embodiment, the conductive film stacked member is described with reference to a touch panel. FIG. 1 is a plan view showing the configuration of the touch panel. FIGS. 2, 3A, and 3B are cross-sectional views showing the configuration of the touch panel. FIG. 2 is a cross-sectional view of the touch panel shown in FIG. 1 taken along the line A-A', and FIGS. 3A and 3B are cross-sectional views of the touch panel shown in FIG. 1 taken along the line B-B'.

The touch panel 100 includes a substrate 1, an input area 5 provided on the substrate 1, and a routing wiring line area 6. The substrate 1 is transparent and made, for example, of quartz glass, glass, or plastic. In the present embodiment, the substrate 1 is described as a glass substrate 1. The glass substrate 1 is molded into a rectangular shape in a plan view.

The input area 5, which is surrounded by the dash-dotted line in FIG. 1, detects information on the position of a finger that touches the touch panel 100. The input area 5 has a plurality of X electrodes 10 and a plurality of Y electrodes 20 disposed therein. The plurality of X electrodes 10 extend along the illustrated X-axis direction and are disposed at certain spacings in the Y-axis direction. The plurality of Y electrodes 20 extend along the illustrated Y-axis direction and are disposed at certain spacings in the X-axis direction. The X electrodes 10 and the Y electrodes 20 intersect each other at intersections K, where bridge wiring lines of the X and Y electrodes intersect each other, in the input area 5.

Each of the X electrodes 10 includes a plurality of island-shaped electrode portions 12 arranged in the X-axis direction and bridge wiring lines 11 connecting adjacent island-shaped electrode portions 12. Each of the island-shaped electrode portions 12 has a rectangular shape in a plan view and one of the diagonals thereof extends along the X axis.

Each of the Y electrodes 20 includes a plurality of island-shaped electrode portions 22 arranged in the Y-axis direction and bridge wiring lines 21 connecting adjacent island-shaped electrode portions 22. Each of the island-shaped electrode portions 22 has a rectangular shape in a plan view and one of the diagonals thereof extends along the Y axis. The island-shaped electrode portions 12 and the island-shaped electrode portions 22 are shifted from each other in the X and Y directions (arranged in a checkered pattern), and the rectangular island-shaped electrode portions 12 and 22 are arranged in a matrix in a plan view in the input area 5.

The X electrodes 10, the Y electrodes 20, and the bridge wiring lines 11 and 12 can be made of a resistive material having transparency, such as ITO (indium tin oxide), IZO® (indium zinc oxide), and ZnO.

The routing wiring line area 6 is the area surrounded by the chain double-dashed line in FIG. 1. The routing wiring line area 6 has a plurality of routing wiring lines 60 formed therein. Each of the routing wiring lines 60 has one end connected to an X electrode 10 or a Y electrode 20 and the other end connected to a drive section (not shown) and an electric signal conversion/computation section (not shown) provided in the interior of the touch panel 100 or an external device.

The routing wiring line area 6 is divided into a first area 6a and a second area 6b. In the present embodiment, the first area 6a corresponds to a terminal connection area electrically connected to the drive section (not shown) and the electric signal conversion/computation section (not shown), and the second area 6b corresponds to the area other than the first area 6a.

The touch panel 100 is configured, as shown in FIGS. 2, 3A, and 3B, in such a way that the island-shaped electrode portions 12 (not shown), the island-shaped electrode portions 22, the bridge wiring lines 11, and the routing wiring lines 60 are disposed on one surface 1a of the glass substrate 1. An inter-electrode insulating film 30 that isolates the X electrodes 10 and the Y electrodes 20 from each other is formed over the bridge wiring lines 11 in such a way that the inter-electrode insulating film 30 is substantially flush with the island-shaped electrode portions 22. The bridge wiring lines 21 are disposed on the inter-electrode insulating film 30. The bridge wiring lines 11 of the X electrodes 10 are thinner than the island-shaped electrode portions 22, for example, approximately one-half thereof in thickness. A planarization film 40 is formed to cover the electrodes and the wiring lines described above. A protective substrate 50 is disposed over the planarization film 40 with an adhesive layer 51 therebetween. A shield layer 70 is provided on the other surface 1b of the glass substrate 1.

The inter-electrode insulating film 30 is made, for example, of polysiloxane, an acrylic resin, or an acrylic monomer. When polysiloxane is used, the inter-electrode insulating film 30 is an inorganic insulating film made of a silicon oxide. On the other hand, when an acrylic resin or an acrylic monomer is used, the inter-electrode insulating film 30 is an organic insulating film made of a resin material. In the following description, an ink obtained by mixing JSR NN525E with EDM (diethylene glycol ethyl methyl ether) at a ratio of 4:1 (weight ratio) is used.

The inter-electrode insulating film 30 is preferably made of a material having a dielectric constant of 4.0 or smaller, desirably 3.5 or smaller. Such a material reduces parasitic capacitance at the intersections K of the bridge wiring lines 11 and 21, whereby the position detection performance of the touch panel can be maintained. At the same time, the inter-electrode insulating film 30 is preferably made of a material having a refractive index of 2.0 or lower, desirably 1.7 or lower. Such a material can reduce the difference in refractive index between the inter-electrode insulating film 30 and the glass substrate 1 and between the inter-electrode insulating film 30 and the X and Y electrodes 10, 20. Decrease in refractive index difference advantageously prevents the pattern of the inter-electrode insulating film 30 from being viewed by a user.

Each of the routing wiring lines 60 includes a first conductive film 60a disposed on the one surface 1a of the glass substrate 1 and a second conductive film 60b formed on the first conductive film 60a. A first protective film 61 that covers the surface of each of the routing wiring lines 60 is formed in the first area 6a. Similarly, a second protective film 62 that covers the surfaces of the routing wiring lines 60 is formed in the second area 6b.

The first conductive film 60a is a transparent conductive film having transparency and made of a resistive material, such as ITO and IZO. The second conductive film 60b is a metal film primarily made of Ag. The second conductive film 60b is, however, not limited to a specific one but may be made of any material that has a sheet resistance lower than that of the first conductive film 60a. The second conductive film 60b is made, for example, of an organic compound, nano-particles, or nano-wires containing not only Ag but also at least one of Au, Al, Cu, Pd, any other suitable metal element, and carbon (nano-carbon, such as graphite nanotubes and carbon nanotubes). Stacking the first conductive film 60a and the second conductive film 60b to form a conductive film stacked structure can reduce the electrical resistivity of the entire routing wiring line 60.

The width W2 of the second conductive film 60b is narrower than the width W1 of the first conductive film 60a, as shown in FIG. 3B. Further, the second conductive film 60b has a surface convexly curved in the direction away from the first conductive film 60a in a cross-sectional view. Specifically, the width W2 of the second conductive film 60b is formed to be narrower than the width W1 of the first conductive film in such a way that both ends of the second conductive film 60b are spaced apart from both ends of the first conductive film by 0.5 to 5 μm. The thickness H of the second conductive film 60b ranges from 0.2 to 2 μm, and the angle θ of each end of the second conductive film 60b in a cross-sectional view ranges from 0.5 to 10 degrees.

The first protective film 61 is formed on the surface of the first conductive film 60a and the surface of the second conductive film 60b. The first protective film 61 is a transparent conductive film having transparency. The first protective film 61 is made, for example, of the same material as that of the first conductive film 60a, which is a resistive material, such as ITO and IZO. FIG. 3B shows how each of the routing wiring lines 60 and the corresponding first protective film 61 are stacked: The stacked structure includes a three-layer stacked portion 80 obtained by stacking the first conductive film 60a, the second conductive film 60b formed on the first conductive film 60a, and the first protective film 61 formed on the second conductive film 60b and a two-layer stacked portion 81 obtained by stacking the first conductive film 60a and the first protective film 61 formed on the first conductive film 60a and located at each end in the width direction of the first conductive film 60a. Since junctions (contacts) are formed between the first conductive film 60a and the first protective film 61 in the two-layer stacked portion 81, the first conductive film 60a and the first protective film 61 encapsulate the second conductive film 60b, whereby the second conductive film 60b can be protected from an external environment.

The second protective film 62 is formed on the surface of the first conductive film 60a and the surface of the second conductive film 60b. The second protective film 62 is insulative and made, for example, of polysiloxane, an acrylic resin, or an acrylic monomer. The stacked structure in the second area 6b is the same as the stacked structure in the first area 6a described above. Specifically, the stacked structure in the second area 6b includes a three-layer stacked portion obtained by stacking the first conductive film 60a, the second conductive film 60b formed on the first conductive film 60a, and the second protective film 62 formed on the second conductive film 60b and a two-layer stacked portion obtained by stacking the first conductive film 60a and the second protective film 62 formed on the first conductive film 60a and located at each end in the width direction of the first conductive film 60a. Since contacts are formed between the first conductive film 60a and the second protective film 62 in the two-layer stacked portion, the first conductive film 60a and the second protective film 62 encapsulate the second conductive film 60b.

The planarization film 40 is formed on the X and Y electrodes 10, 20 and the routing wiring lines 60 in the second area 6b (on the second protective film 62). The protective substrate 50 is disposed over the planarization film 40 with the adhesive layer 51 therebetween. The shield layer 70 is disposed on the other surface 1b of the glass substrate 1. It is noted that the planarization film 40, the protective substrate 50, or other components are not provided on the routing wiring lines 60 in the first area 6a. The reason for this is that the routing wiring lines 60 in the first area 6a need to be connected to the drive section (not shown) and the electric signal conversion/computation section (not shown).

Since the planarization film 40 planarizes the one surface 1a of the glass substrate 1, the protective substrate 50 can be uniformly joined to the glass substrate 1 substantially thereacross. The planarization film 40 is preferably made of a material having a refractive index of 2.0 or lower, desirably 1.7 or lower. Such a material can reduce the difference in refractive index between the planarization film 40 and the glass substrate 1 and between the planarization film 40 and the X and Y electrodes 10, 20. Decrease in refractive index difference helps the wiring patterns of the X and Y electrodes 10, 20 to be hardly visible.

The protective substrate 50 is a transparent substrate made, for example, of glass or plastic. Alternatively, when the touch panel 100 of the present embodiment is disposed in a front portion of a display device, such as a liquid crystal panel and an organic EL panel, the protective substrate 50 can be replaced with an optical element substrate (such as a polarizer and a wave plate) used as part of the display device.

The shield layer 70 is formed by depositing a transparent conductive material, such as ITO and IZO®, on the other surface 1b of the glass substrate 1. The shield layer 70 may alternatively be formed by preparing a film on which a transparent conductive film, which will form a shield layer, is formed and bonding the film to the other surface 1b of the glass substrate 1. Providing the shield layer 70 blocks any electric field from penetrating the other surface 1b of the glass substrate 1. In this way, the electric field radiated from the touch panel 100 will not affect the display device or other devices, and the electric field radiated from the display device and other external apparatus will not affect the touch panel 100. The shield layer 70 is formed on the other surface 1b of the glass substrate 1 in the present embodiment, but the shield layer 70 may alternatively be formed on the one surface 1a of the glass substrate 1.

The principle according to which the touch panel 100 operates will now be briefly described. First, the drive section (not shown) supplies a predetermined potential to the X electrodes 10 and the Y electrodes 20 through the routing wiring lines 60. On the other hand, a ground potential, for example, is inputted to the shield layer 70.

With the potentials supplied as described above, assume that a finger approaches the protective substrate 50 toward the input area 5. Parasitic capacitance is produced between the finger approaching the protective substrate 50 and the X and Y electrodes 10, 20 in the vicinity of the approaching finger. Since the X and Y electrodes 10, 20 where the parasitic capacitance has been produced charge the parasitic capacitance, the potential temporarily decreases.

The drive section, which senses the potential at each of the electrodes, immediately detects a pair of X and Y electrodes 10, 20 where the decrease in potential described above occurs. The electric signal conversion/computation section analyzes the position of the detected electrode pair to detect the information on the position of the finger in the input area 5. Specifically, the X electrode 10 extending in the X-axis direction detects the Y coordinate of the position of the approaching finger in the input area 5, and the Y electrode 20 extending in the Y-axis direction detects the X coordinate in the input area 5.

Method for Manufacturing Conductive Film Stacked Member

Figure 4:
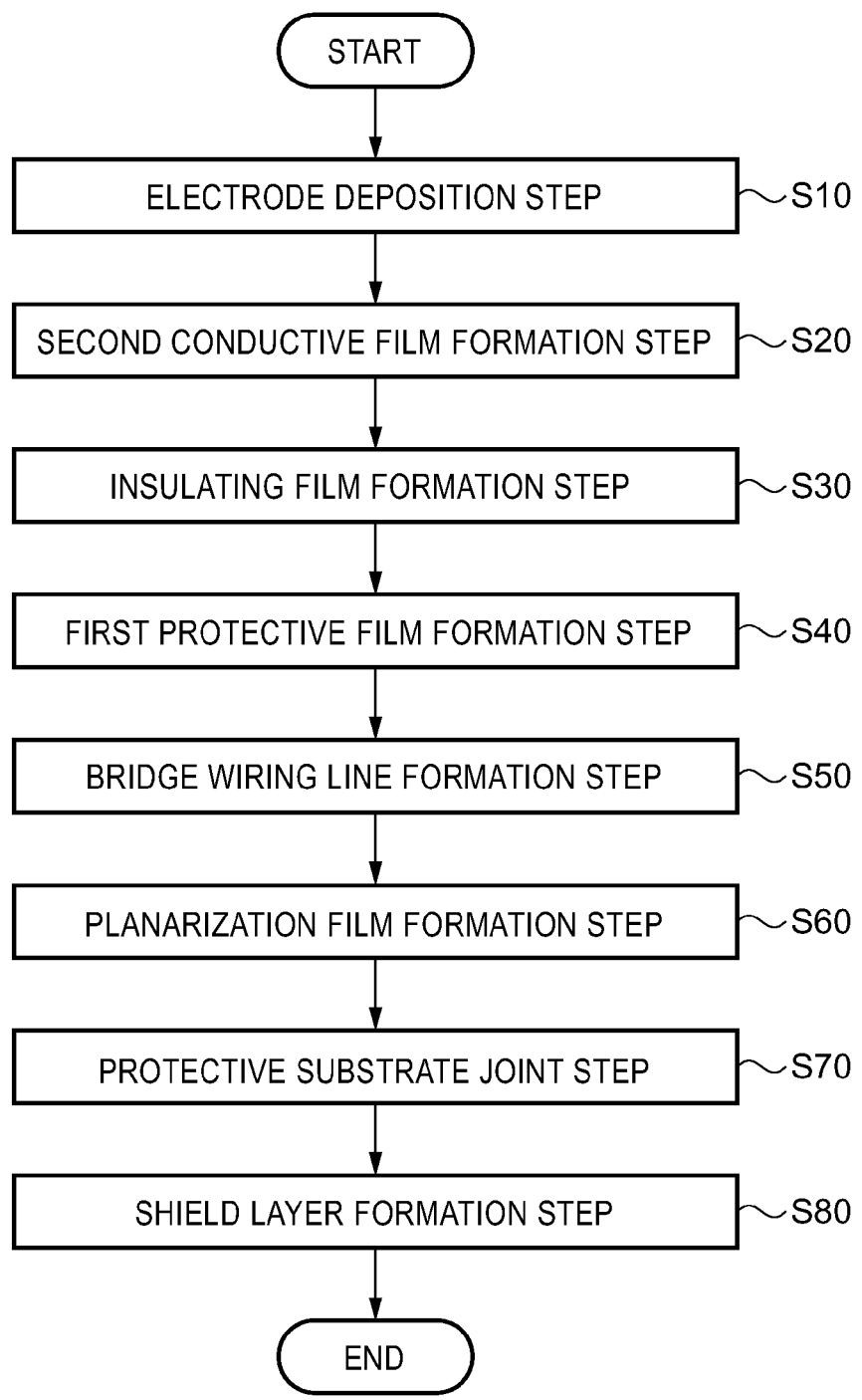
FIG. 4 is a flowchart showing a method for manufacturing a touch panel.

A method for manufacturing the conductive film stacked member will next be described. In the present embodiment, a method for manufacturing a touch panel as the conductive film stacked member will be described. FIG. 4 is a flowchart showing the method for manufacturing a touch panel.

The method for manufacturing a touch panel of the present embodiment includes an electrode deposition step S10 of forming the island-shaped electrode portions 12 and 22, the bridge wiring lines 11, and the first conductive films 60a, which will form part of the routing wiring lines 60, on the one surface 1a of the glass substrate 1, a second conductive film formation step S20 of forming the second conductive films 60b on the first conductive films 60a, an insulating film formation step S30 of forming the inter-electrode insulating film 30 on the bridge wiring lines 11 and forming the second protective films 62 that cover the routing wiring lines 60 in the second area 6b, a first protective film formation step S40 of forming the first protective films 61 that cover the routing wiring lines 60 in the first area 6a, a bridge wiring line formation step S50 of forming the bridge wiring lines 21 that extend above the inter-electrode insulating film 30 and connect adjacent island-shaped electrode portions 22, a planarization film formation step S60 of forming the planarization film 40 that planarizes the one surface 1a of the glass substrate 1, a protective substrate joint step S70 of joining the protective substrate 50 to the planarization film 40 via the adhesive layer 51, and a shield layer formation step S80 of forming the shield layer 70 on the other surface 1b of the glass substrate 1.

Figure 5:
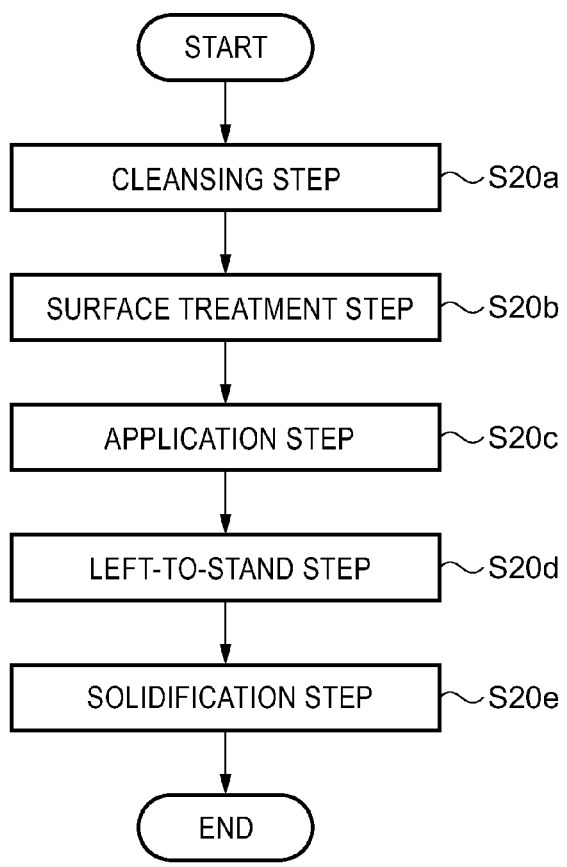
FIG. 5 is a flowchart showing part of the method for manufacturing a touch panel.

FIG. 5 is a flowchart showing part of the method for manufacturing a touch panel. That is, FIG. 5 is a flowchart for describing the second conductive film formation step S20 in the method for manufacturing a touch panel in more detail.

As shown in FIG. 5, the second conductive film formation step S20 includes a cleansing step S20a of cleansing the surface of a base member 1' formed of the glass substrate 1, on the one surface 1a of which the first conductive films 60a have been formed, a surface treatment step S20b of performing surface treatment on the surface of the base member 1', an application step S20c of applying a functional liquid containing an aqueous carrier medium in which metal particles, which will be the material of the second conductive films 60b, are dispersed onto the first conductive films 60a, a left-to-stand step S20d of leaving the base member 1', to which the functional liquid has adhered, to stand, and a solidification step S20e of solidifying the applied functional liquid to form the second conductive films 60b on the first conductive films 60a.

In the present embodiment, a surface treatment apparatus is used in the surface treatment step S20b described above, and a droplet discharge apparatus is used in the application step S20c and other steps. Before the description of the method for manufacturing a touch panel is made, the surface treatment apparatus and the droplet discharge apparatus will be described.

Figure 6:
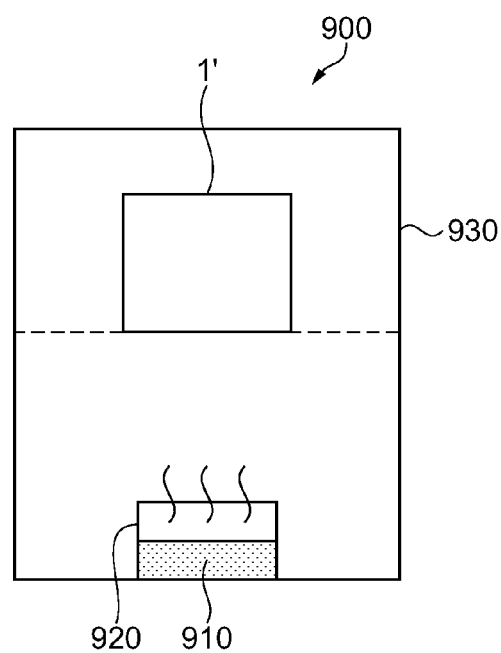
FIG. 6 is a schematic diagram showing the configuration of a surface treatment apparatus.

The surface treatment apparatus will first be described. FIG. 6 is a schematic diagram showing the configuration of the surface treatment apparatus. The surface treatment apparatus 900 is an apparatus for performing surface treatment on a base member by using hexamethyldisilazane as a surface treatment agent, typically an apparatus for performing an HMDS treatment. In the present embodiment, the surface treatment apparatus 900 is configured to operate based on gas diffusion. The surface treatment apparatus 900 includes hexamethyldisilazane (HMDS) 910, a dish container 920 in which the hexamethyldisilazane 910 is put, and an accommodating container 930 that hermetically accommodates the dish container 920 and the base member 1'. To perform a surface treatment, the dish container 920, in which the hexamethyldisilazane 910 has been put, and the base member 1' are placed in the accommodating container 930 in such a way that the base member 1' is located above the dish container 920, and then the accommodating container 930 is hermetically closed. The hexamethyldisilazane 910 is then vaporized so that the accommodating container 930 is filled with the gaseous hexamethyldisilazane 910. In this manner, the base member 1' reacts with the hexamethyldisilazane 910, and the base member 1' undergoes surface treatment.

Figure 7:
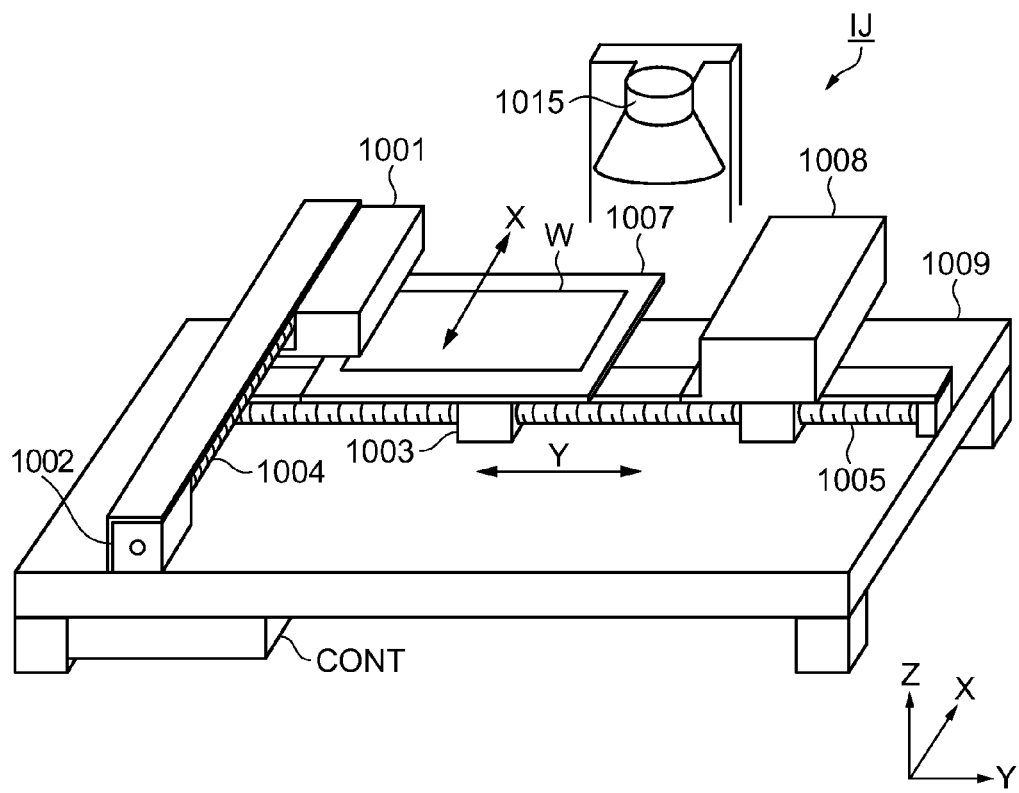
FIG. 7 is a perspective view showing the configuration of a droplet discharge apparatus.

The droplet discharge apparatus will next be described. FIG. 7 is a perspective view showing the configuration of the droplet discharge apparatus. The droplet discharge apparatus IJ includes a droplet discharge head 1001, an X-axis drive shaft 1004, a Y-axis guide shaft 1005, a controller CONT, a stage 1007, a cleaning mechanism 1008, a base mount 1009, and a heater 1015.

The stage 1007 supports a workpiece W to which the functional liquid is applied and includes a fixing mechanism (not shown) for fixing the workpiece W in a reference position.

The droplet discharge head 1001 is a multiple nozzle type droplet discharge head with a plurality of discharge nozzles, and the longitudinal direction of the droplet discharge head 1001 coincides with the X-axis direction. The plurality of discharge nozzles are disposed at fixed spacings in a lower surface of the droplet discharge head 1001. The discharge nozzles of the droplet discharge head 1001 discharge droplets of the functional liquid toward the workpiece W supported on the stage 1007 to apply the functional liquid onto the workpiece W.

The X-axis drive shaft 1004 is connected to an X-axis drive motor 1002. The X-axis drive motor 1002 is formed, for example, of a stepper motor. When an X-axis drive signal is supplied from the controller CONT, the X-axis drive motor 1002 rotates the X-axis drive shaft 1004. When the X-axis drive shaft 1004 is rotated, the droplet discharge head 1001 is moved in the X-axis direction.

The Y-axis guide shaft 1005 is fixed so that it is stationary relative to the base mount 1009. The stage 1007 includes a Y-axis drive motor 1003. The Y-axis drive motor 1003 is formed, for example, of a stepper motor. When a Y-axis drive signal is supplied from the controller CONT, the Y-axis drive motor 1003 moves the stage 1007 in the Y-axis direction.

The controller CONT supplies a droplet discharge control voltage to the droplet discharge head 1001. The controller CONT also supplies a drive pulse signal for controlling the motion of the droplet discharge head 1001 in the X-axis direction to the X-axis drive motor 1002 and a drive pulse signal for controlling the motion of the stage 1007 in the Y-axis direction to the Y-axis drive motor 1003.

The cleaning mechanism 1008 cleans the droplet discharge head 1001. The cleaning mechanism 1008 includes a Y-axis drive motor (not shown). Driving the Y-axis drive motor moves the cleaning mechanism along the Y-axis guide shaft 1005. The motion of the cleaning mechanism 1008 is also controlled by the controller CONT.

In the present embodiment, the heater 1015 is a lamp-based annealing unit for performing heat treatment on the workpiece W and vaporizes and dries a solvent contained in the functional liquid placed on the workpiece W. The heater 1015 is turned on and off by the controller CONT as well.

The droplet discharge apparatus IJ discharges droplets toward the workpiece W through the plurality of discharge nozzles arranged in the X-axis direction in the lower surface of the droplet discharge head 1001, while continuously moving the droplet discharge head 1001 and the stage 1007, which supports the workpiece W, relative to each other.

Figure 8:
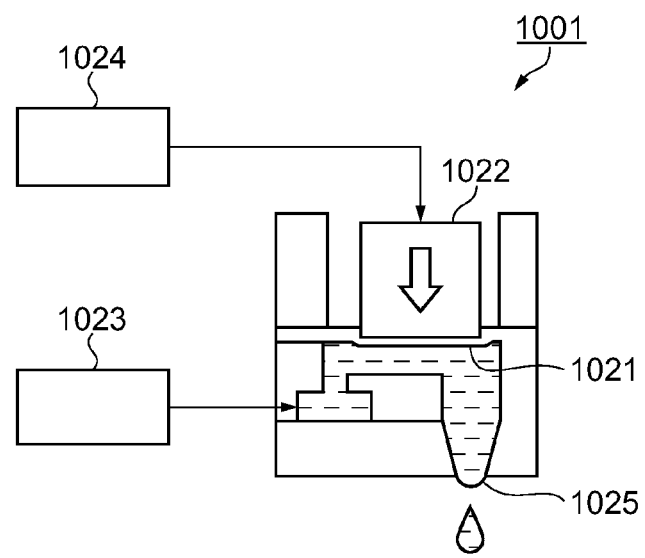
FIG. 8 is a schematic diagram showing the principle according to which a functional liquid is discharged by using a piezoelectric device.

FIG. 8 is a schematic diagram showing the principle according to which the functional liquid is discharged by using a piezoelectric device. In FIG. 8, a piezoelectric device 1022 is disposed adjacent to a liquid chamber 1021 that accommodates the functional liquid. The functional liquid is supplied to the liquid chamber 1021 through a liquid material supply system 1023 including a material tank that accommodates the functional liquid. The piezoelectric device 1022 is connected to a drive circuit 1024, which applies a voltage to the piezoelectric device 1022 so that the piezoelectric device 1022 is deformed, whereby the liquid chamber 1021 is deformed and the functional liquid is discharged through a discharge nozzle 1025. In this case, the amount of deformation of the piezoelectric device 1022 is controlled by changing the magnitude of the applied voltage. Further, the speed at which the piezoelectric device 1022 is deformed is controlled by changing the frequency of the applied voltage. Since discharging droplets by using a piezoelectric device does not heat the material of the droplets, the composition of the material is advantageously unlikely affected.

A description will be made of the method for manufacturing a touch panel again. FIGS. 9A to 9D and 10A to 10C show steps in the method for manufacturing a touch panel.

First, in the electrode deposition step S10, the X electrodes 10 (island-shaped electrode portions 12 and bridge wiring lines 11), the island-shaped electrode portions 22, and the first conductive films 60a, which will form part of the routing wiring lines 60, are formed on the glass substrate 1. The formation can be carried out, for example, by using photolithography. Specifically, after sputtering or any other suitable method is used to form an ITO film on a substantially entire portion of the one surface 1a of the glass substrate 1, photolithography and etching are used to pattern the ITO film so that the X electrodes 10 (island-shaped electrode portions 12 and bridge wiring lines 11), the island-shaped electrode portions 22, and the first conductive films 60a of the routing wiring lines 60 are formed. Instead of using photolithography, the droplet discharge apparatus IJ shown in FIG. 7 can be used along with an inkjet method. For example, a functional liquid containing ITO particles is discharged in the form of droplets and applied onto the glass substrate 1. Thereafter, the X electrodes 10 (island-shaped electrode portions 12 and bridge wiring lines 11), the island-shaped electrode portions 22, and the first conductive films 60a, which will form part of the routing wiring lines 60, which are all formed of aggregated ITO particles, can be formed on the glass substrate 1 by drying and solidifying the functional liquid (droplets) applied onto the glass substrate 1.

In the electrode deposition step S10 in the present embodiment, the ITO film is formed by discharging the droplets containing the ITO particles. Alternatively, droplets containing IZO® particles may be used to form a transparent conductive film made of IZO®.

The procedure then proceeds to the second conductive film formation step S20. First, in the cleansing step S20a in the second conductive film formation step S20, the base member 1' formed of the glass substrate 1 on which the first conductive films 60a have been formed is cleansed. The cleansing can be carried out, for example, by UV cleansing, plasma cleansing, or HF (hydrofluoric acid) cleansing. The contact angle at which the glass substrate 1 comes into contact with water after the base member 1' is cleansed is approximately 10 degrees or smaller, and the contact angle at which each of the first conductive films 60a comes into contact with water is also approximately 10 degrees or smaller. That is, the entire surface of the base member 1' becomes a hydrophilic area.

In the next surface treatment step S20b, the surface treatment apparatus 900 shown in FIG. 6 is used to perform surface treatment on the surface of the base member 1' in a gas diffusion-based HMDS treatment. In the present embodiment, the hexamethyldisilazane (($CH_3$)$_3$SiNHSi($CH_3$)$_3$) 910 is used as a surface treatment agent. Specifically, the dish container 920 in which the hexamethyldisilazane 910 has been put and the base member 1' are placed in the accommodating container 930 in such a way that the base member 1' is located above the dish container 920, and then the accommodating container 930 is kept hermetic. The hexamethyldisilazane 910 is vaporized, and the base member 1' is exposed to the resultant gaseous environment.

Figure 11A:
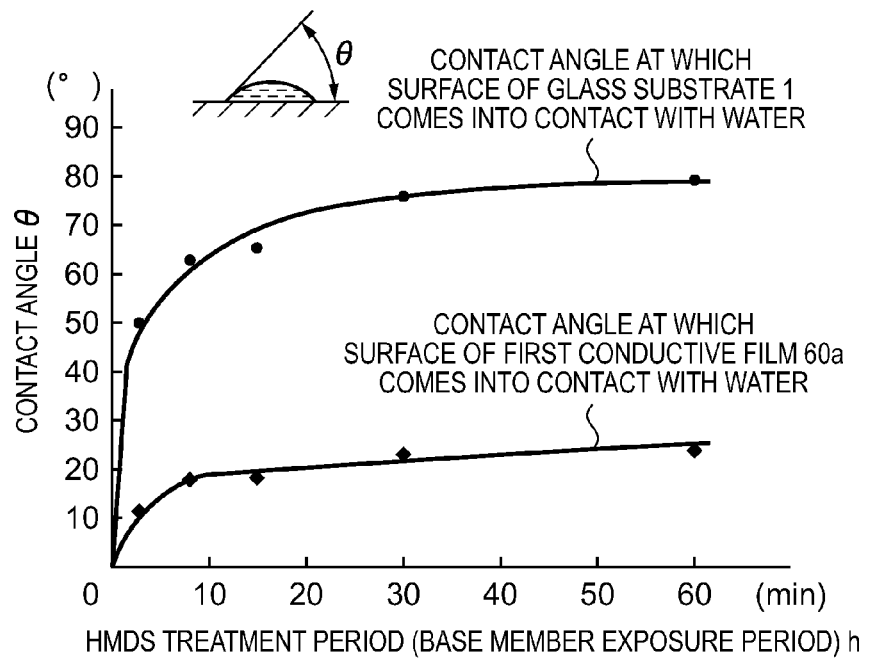
FIGS. 11A and 11B show measured data on the contact angle for a base member.
Figure 11B:
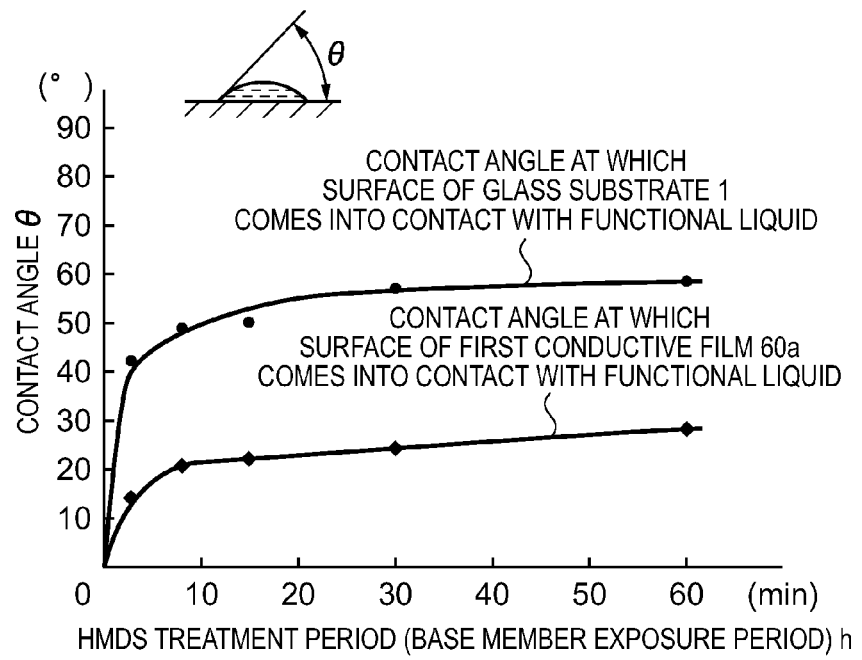

The conditions in which the base member 1' undergoes the surface treatment can be set as appropriate in consideration of, for example, the configuration of the base member 1' and the nature of the functional liquid, which will be applied later. The surface treatment conditions will now be described with reference to a specific example. FIGS. 11A and 11B show measured data on the contact angle for the base member. FIG. 11A shows measured data on the contact angle θ at which the surface of the glass substrate 1 comes into contact with water and the contact angle θ at which the surface of each of the first conductive films 60a comes into contact with water with the horizontal axis being surface treatment period h and the vertical axis being contact angle θ. FIG. 11B shows measured data on the contact angle θ at which the surface of the glass substrate 1 comes into contact with the functional liquid and the contact angle θ at which the surface of each of the first conductive films 60a comes into contact with the functional liquid with the horizontal axis being surface treatment period h and the vertical axis being contact angle θ. It is noted that the hexamethyldisilazane 910 used in the surface treatment has been vaporized at room temperature (ranging from approximately 20 to 25° C.) and that the functional liquid is a liquid material containing an aqueous carrier medium in which silver particles are dispersed. As shown in FIG. 11A, the contact angle θ at which the surface of the glass substrate 1 comes into contact with water sharply increases for approximately 20 minutes from the start of the surface treatment and becomes 50 degrees or greater when 3 minutes has elapsed since the surface treatment started. In the surface treatment period of 20 minutes or later, the contact angle θ gradually increases. On the other hand, the contact angle θ at which the surface of each of the first conductive films 60a comes into contact with water sharply increases for approximately 10 minutes from the start of the surface treatment but does not exceed approximately 25 degrees. FIG. 11A therefore shows that the surface treatment (HMDS treatment) forms a high water repellency area (the surface of the glass substrate 1) and a low water repellency area (each of the first conductive films 60a) at the same time, that is, the contrast therebetween.

As shown in FIG. 11B, the contact angle θ at which the surface of the glass substrate 1 comes into contact with the functional liquid sharply increases for approximately 10 minutes from the start of the surface treatment and becomes 40 degrees or greater when 3 minutes has elapsed since the surface treatment started. In the surface treatment period of 10 minutes or later, the contact angle θ gradually increases. On the other hand, the contact angle θ at which the surface of each of the first conductive films 60a comes into contact with the functional liquid sharply increases for approximately 10 minutes from the start of the surface treatment but does not exceed approximately 30 degrees. FIG. 11B therefore also shows that the surface treatment (HMDS treatment) forms a high water repellency area (the surface of the glass substrate 1) and a low water repellency area (each of the first conductive films 60a) at the same time.

In consideration of the measured data shown in FIGS. 11A and 11B described above, the conditions in which the base member 1' undergoes the surface treatment in the present embodiment are set as follows: The hexamethyldisilazane 910 is vaporized at room temperature and the period during which the base member 1' is exposed to the vaporized hexamethyldisilazane 910 ranges from approximately 3 to 15 minutes. Among the surface treatment conditions, for example, the period during which the base member 1' is exposed to the vaporized hexamethyldisilazane 910 may be 3 minutes or shorter or 15 minutes or longer (but shorter than or equal to 60 minutes) in accordance with the situations in which the base member 1' is processed.

The state of the surface of the base member 1' in the surface treatment will next be described in more detail. FIGS. 12A to 12D are schematic views showing the base member that has undergone the surface treatment. FIG. 12A shows the state of the surface of the glass substrate 1 before the surface treatment (after the cleansing step S20a). In this state, a large number of hydroxyl groups (—OH) are present on the surface of the glass substrate 1 and hence the glass substrate 1 is hydrophilic. The contact angle θ at which the glass substrate 1 comes into contact with water is therefore approximately 10 degrees or smaller, as shown in FIG. 12B. The surface of each of the first conductive films 60a is also hydrophilic, as in the case of the surface of the glass substrate 1, and hence the contact angle θ at which the surface of each of the first conductive films 60a comes into contact with water is approximately 10 degrees or smaller. The contact angle θ used herein is defined as follows: Assume that a liquid (a water droplet in the present embodiment) is present on the surface of a solid (the surface of the glass substrate 1 and the surface of each of the first conductive films 60a in the present embodiment) in the atmosphere (in air). The angle between a line passing through the point where three phases, gas, liquid, and solid, meet and tangent to the liquid and the surface of the solid (the angle being on the side where the liquid is present) is the contact angle θ at which the solid comes into contact with the liquid. Therefore, the smaller the contact angle is, the more the water droplet wets the surface of the glass substrate 1 and spreads thereover. That is, the surface exhibits hydrophilicity. On the other hand, the larger the contact angle is, the more the surface of the glass substrate 1 repels the water droplet. That is, the surface exhibits water repellency.

FIG. 12C shows the state of the surface of the glass substrate 1 after the surface treatment. As shown in FIG. 12C, the hexamethyldisilazane 910 reacts with the water (—OH) on the surface of the glass substrate 1, and ammonia ($NH_3$) is produced. The surface of the glass substrate 1 is thus coated with trimethylsilyl (—Si(CH$_3$)$_3$). That is, the surface of the glass substrate 1 has undergone a water repellency treatment. As a result, the contact angle θ at which the glass substrate 1 comes into contact with water becomes approximately 50 degrees or greater, which is greater than that before the surface treatment, as shown in FIG. 12D. On the other hand, since the surface of each of the first conductive films 60a slowly reacts with the hexamethyldisilazane 910, the first conductive film 60a undergoes a weaker water repellency treatment that provides water repellency weaker than that of the glass substrate 1. That is, the first conductive film 60a has undergone a weaker water repellency treatment (hydrophilicity is maintained). Specifically, the contact angle at which the first conductive film 60a comes into contact with water becomes approximately 25 degrees or smaller. As a result, in the surface treatment step S20b, a high water repellency area (the surface area of the glass substrate 1) and a low water repellency area (the surface area of each of the first conductive films 60a) can be formed at the same time on the single base member 1'.

In the present embodiment, the hexamethyldisilazane 910 is used as the surface treatment agent. The surface treatment agent may alternatively be, for example, trimethylmethoxysilane (CH$_3$Si (OCH$_3$)$_3$), trimethylchlorosilane ((CH$_3$)$_3$SiCl), or any other suitable silane compound. Further, gas diffusion is used as the HMDS treatment in the present embodiment. The HMDS treatment may alternatively be, for example, a bubbling method in which nitrogen gas is blown into a bottle that accommodates liquid HMDS so that the liquid HMDS bubbles and the resultant HMDS vapor is sprayed onto the base member.

In the next application step S20c, the functional liquid containing an aqueous carrier medium in which metal particles, which will form the second conductive films 60b, are dispersed is applied onto the first conductive films 60a. The metal material of the second conductive films 60b should have an electrical resistivity lower than that of the first conductive films 60a. For example, a metal material containing silver particles can be used. The material that can be used to form the second conductive films 60b is not limited to a material containing silver particles but may, for example, be a material containing Au, Al, Cu, Pd, or any other suitable metal particles or a material containing graphite nanotubes or carbon nanotubes. Metal particles and carbon particles are dispersed in the functional liquid in the form of nano-particles or nano-wires.

Figure 13A:
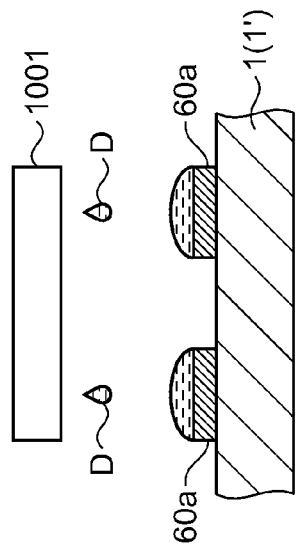
FIGS. 13A to 13D are schematic views showing the state of an applied functional liquid.

FIGS. 13A to 13D are schematic views showing the state of the applied functional liquid in the application step S20c. As shown in FIG. 13A, the droplet discharge apparatus IJ is used in the present embodiment to discharge the functional liquid in the form of droplets D so that the functional liquid is applied onto the first conductive films 60a. Specifically, the droplet discharge head 1001 is driven to carry out a discharge action while the stage 1007 and the droplet discharge head 1001 are moved relative to each other. As a result, the droplets D are discharged and adhere to the first conductive films 60a. In this process, the amount of droplets D is set as appropriate in consideration of the wiring width of each of the first conductive films 60a or the state of the surface of each of the first conductive films 60a. As shown in FIG. 11B, the contact angle θ at which the glass substrate 1 comes into contact with the functional liquid (droplets D) is approximately 40 degrees or greater. On the other hand, the contact angle θ at which each of the first conductive films 60a comes into contact with the functional liquid (droplets D) is approximately 30 degrees or smaller. The surface treatment step S20b allows the contrast between a high water repellency area (the surface area of the glass substrate 1) and a low water repellency area (the surface area of each of the first conductive films 60a) to be maintained also for the functional liquid, as in the case of the contact angle with respect to water.

Figure 13B:
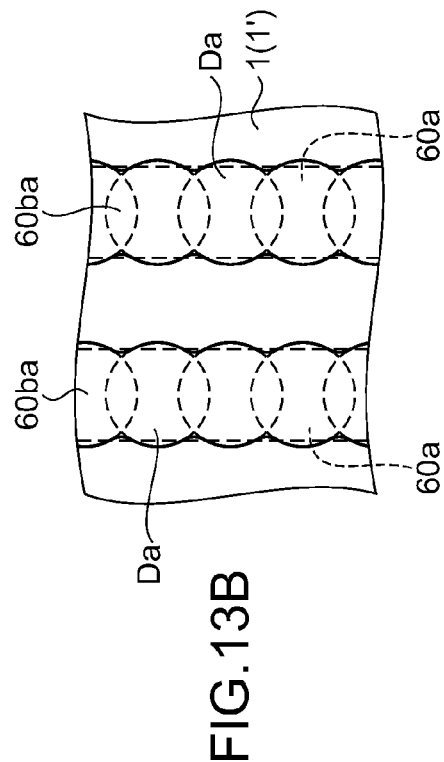

FIG. 13B is a schematic plan view showing the state of droplet dots Da formed of the droplets D having reached the first conductive films 60a. The droplets D discharged from the droplet discharge head 1001 reach the first conductive films 60a, and the droplet dots Da having reached the first conductive films 60a wet the first conductive films 60a and spread thereover. In the application step S20c, the droplets D are discharged multiple times so that each of the droplet dots Da applied onto the first conductive films 60a comes into contact with other adjacent droplet dots Da. Adjacent droplet dots Da are successively connected to each other to form a row, as shown in FIG. 13B, and the surface of the liquid applied onto each of the first conductive films 60a has protrusions and recesses in a plan view. The applied droplet dots Da wet the first conductive film 60a and spread thereover, but do not wet the surface of the glass substrate 1 or spread thereover. The reason for this is that the surface of the glass substrate 1 has undergone the water repellency treatment and hence the droplet dots Da are constrained not to wet or spread over the portion beyond at the boundary between the first conductive film 60a and the glass substrate 1. In the application step S20c, the amount of application (amount of discharged droplets) is adjusted as appropriate in consideration of the thickness of each of the second conductive films 60b to be formed.

Figure 13C:
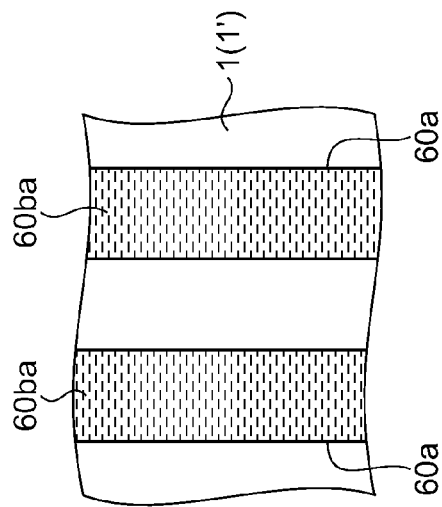

In the next left-to-stand step S20d, the base member 1' onto which the functional liquid has been applied is left to stand. For example, the base member 1' is left to stand for approximately 1 to 10 minutes at room temperature. FIG. 13C is a schematic view showing the state of the liquid after the left-to-stand step. As shown in FIG. 13C, the functional liquid applied onto each of the first conductive films 60a has a shape that follows the shape of the pattern of the first conductive film 60a. That is, the state of the liquid having the protrusions and recesses shown in FIG. 13B changes to the state of the liquid following the shape of the pattern of the first conductive films 60a, specifically, in the present embodiment, the state of the liquid following the linear shape of the pattern of the first conductive films 60a. The reason for this is that in the state of the liquid having the protrusions and recesses shown in FIG. 13B, the surface of the first conductive film 60a at each of the recesses where adjacent droplet dots Da are connected exhibits low water repellency (hydrophilicity). As a result, the liquid wets and spreads over the surface in the width direction of the wiring line of the first conductive film 60a. On the other hand, since the surface of the glass substrate 1 at each of the protrusions has undergone the high water repellency treatment, the functional liquid is repelled at the boundary between the first conductive film 60a and the glass substrate 1, and the repelled functional liquid moves toward the first conductive film 60a. In the thus left-to-stand step, the functional liquid moves in a self-alignment manner, resulting in the state of the liquid following the shape of the pattern of the first conductive film 60a. Since the left-to-stand step S20d is designed in consideration of the period necessary for the functional liquid applied onto the first conductive film 60a to move in a self-alignment manner, the left-to-stand step S20d can be omitted, for example, when the functional liquid quickly moves in a self-alignment manner.

Figure 13D:
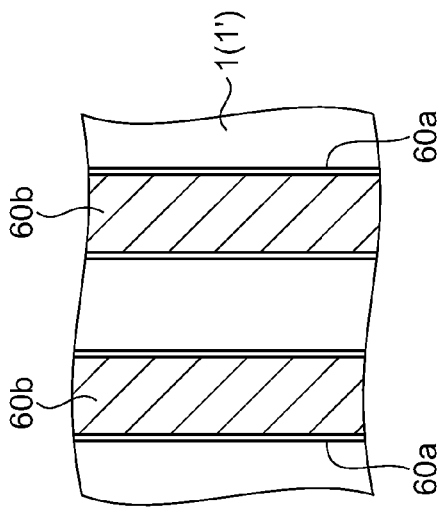

In the next solidification step S20e, the applied functional liquid is solidified to form the second conductive films 60b. For example, the base member 1' is heated and baked at 230° C. for one hour. In the solidification step S20e, a solvent portion of the applied functional liquid is vaporized and hence the functional liquid is contracted in volume. As a result, the second conductive films 60b, each of which has a width narrower than that of the corresponding first conductive film 60a, is formed on the respective first conductive films 60a, as shown in FIG. 13D. In the present embodiment, after the steps described above have been carried out, the second conductive films 60b, each of which has a width narrower than that of the corresponding first conductive film 60a and has a surface convexly curved in the direction away from the first conductive film 60a in a cross-sectional view, are formed. More specifically, each of the thus formed second conductive films 60b has a width narrower than the width of the corresponding first conductive film 60a in such a way that both ends of the second conductive film 60b are spaced apart from both ends of the first conductive film 60a in the width direction by 0.5 to 5 μm, a thickness ranging from 0.2 to 2 μm, and an end angle in a cross-sectional view ranging from 0.5 to 10 degrees.

Figure 9A:
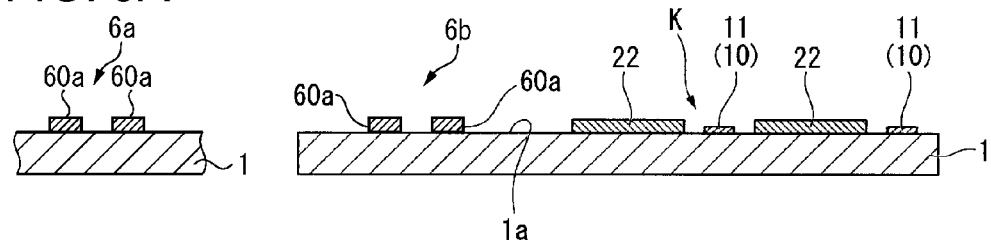
FIGS. 9A to 9D show steps in the method for manufacturing a touch panel.
Figure 9B:
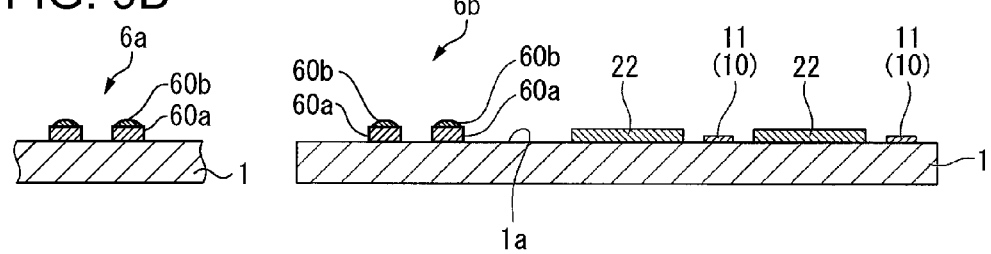
Figure 9C:
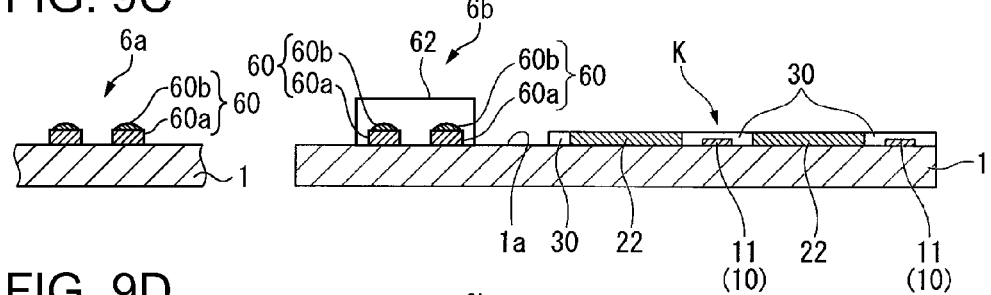

In the next insulating film formation step S30, the inter-electrode insulating film 30 is formed in the gaps between the island-shaped electrode portions 12 and 22 in such a way that the bridge wiring lines 11 of the X electrode 10 are buried, as shown in FIG. 9C. At the same time, the second protective film 62, which covers the routing wiring lines 60 in the second area 6b, is formed. In the insulating film formation step S30, for example, the droplet discharge apparatus IJ is used to discharge droplets D of a functional liquid containing an insulating film material (for example, a polysiloxane-containing liquid material, an acrylic resin, or an acrylic monomer) so that the functional liquid is applied onto the areas described above. The applied functional liquid is then dried and solidified to form the inter-electrode insulating film 30 and the second protective film 62. To form the inter-electrode insulating film 30, the droplets are preferably disposed with no space therebetween at least in the areas on the bridge wiring lines 11. In this way, the inter-electrode insulating film 30 can be formed without any holes or cracks that reach the bridge wiring lines, whereby no insulation failure in the inter-electrode insulating film 30 or disconnection of the bridge wiring lines 21 occurs. The thus deposited inter-electrode insulating film 30 deposited at each of the intersections K should be substantially flush with the upper surfaces of the corresponding island-shaped electrode portions 22 with what is called raised exudation suppressed. The raised exudation is s phenomenon in which both ends of the inter-electrode insulating film 30 rise because the insulating film 30 is in contact with the corresponding island-shaped electrode portions 22, which work as barriers, and surface tension acts on the portions of the inter-electrode insulating film 30 that are in contact with the island-shaped electrode portions 22.

In the next first protective film formation step S40, the first protective films 61, which cover the routing wiring lines 60 in the first area 6a, are formed. For example, photolithography is used to form the first protective films 61. In a light exposure process in the photolithography, since the surface of each of the first conductive films 60a has a uniform curved surface with no protrusion or recess as described above, halation and other irregular reflection are suppressed, whereby a patterned film can be formed with precision.

Figure 9D:
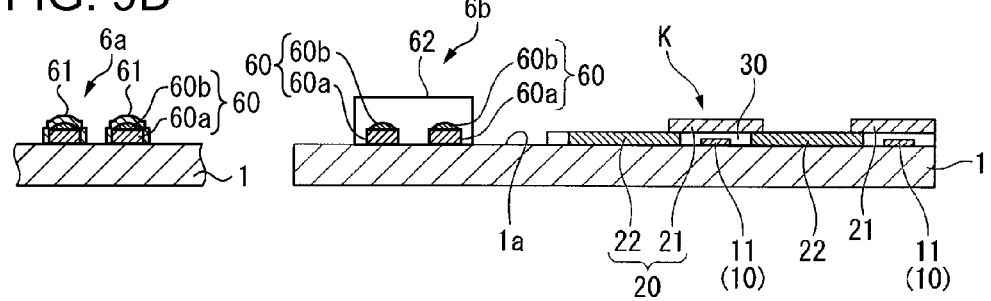

The procedure then proceeds to the bridge wiring line formation step S50. In the bridge wiring line formation step S50, droplets of a liquid material containing ITO particles are placed over adjacent island-shaped electrode portions 22 and the inter-electrode insulating film 30 therebetween to form a wiring line, as shown in FIG. 9D. Thereafter, the liquid material on the glass substrate 1 is dried and solidified. The bridge wiring line 21, which connects the adjacent island-shaped electrode portions 22, is thus formed. Each of the thus formed bridge wiring lines 21 has a linear shape without any bending portion produced when raised exudation occurs in the underlying portion, because the inter-electrode insulating film 30 at each of the intersections K, which form the underlying portion, has its contour following the barriers (island-shaped electrode portions 22) and is hence substantially flush with the island-shaped electrode portions 22 when the bridge line wiring lines 21 is formed. It is noted that the liquid material used to form the bridge wiring lines 21 is not limited to the liquid material containing the ITO particles described above but may be a liquid material containing IZO® particles or ZnO particles.

In the bridge wiring line formation step S50, the same liquid material as that used in the electrode deposition step S10 is preferably used to form the bridge wiring lines 21. That is, the bridge wiring lines 21 are preferably made of the same material as those of the X electrode 10 and the island-shaped electrode portions 22.

Figure 10A:
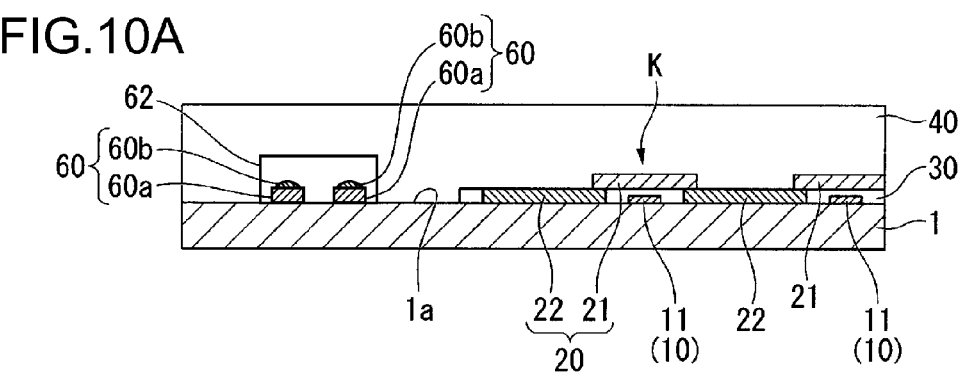
FIGS. 10A to 10C show other steps in the method for manufacturing a touch panel.
Figure 10B:
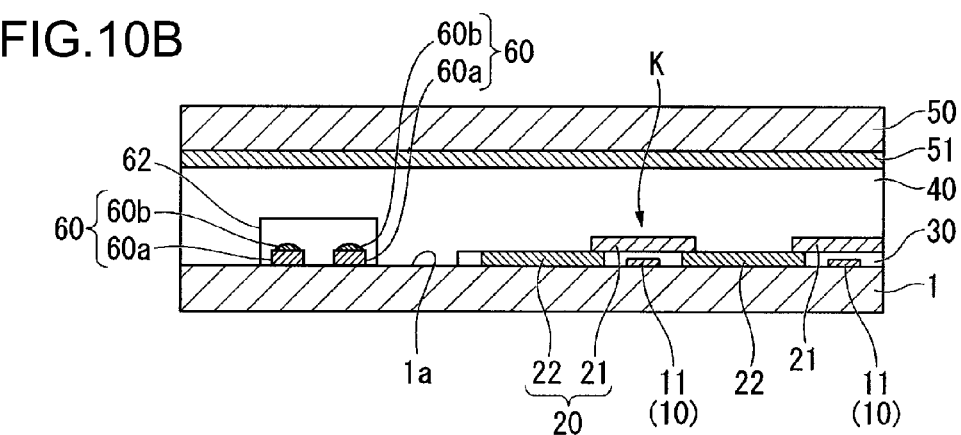

The procedure then proceeds to the planarization film formation step S60. In the planarization film formation step S60, the planarization film 40 made of an insulating material is formed substantially all over the one surface 1a of the glass substrate 1, as shown in FIG. 10A, in order to planarize the one surface 1a. The planarization film 40 can be made of the same liquid material as that used to form the inter-electrode insulating film 30 used in the insulating film formation step S30. It is, however, preferable that a resin material is used to form the planarization film 40 because the planarization film 40 is intended to planarize the surface of the glass substrate 1.

The procedure then proceeds to the protective substrate joint step S70. In the protective substrate joint step S70, an adhesive is placed between the protective substrate 50, which is separately prepared, and the planarization film 40, and the protective substrate 50 is bonded to the planarization film 40 via the adhesive layer 51 made of the adhesive described above, as shown in FIG. 10B. The protective substrate 50 is not limited to a transparent substrate made, for example, of glass or plastic but may be a polarizer, a wave plate, or any other suitable optical element substrate. The adhesive that forms the adhesive layer 51 may, for example, be a transparent resin material.

Figure 10C:
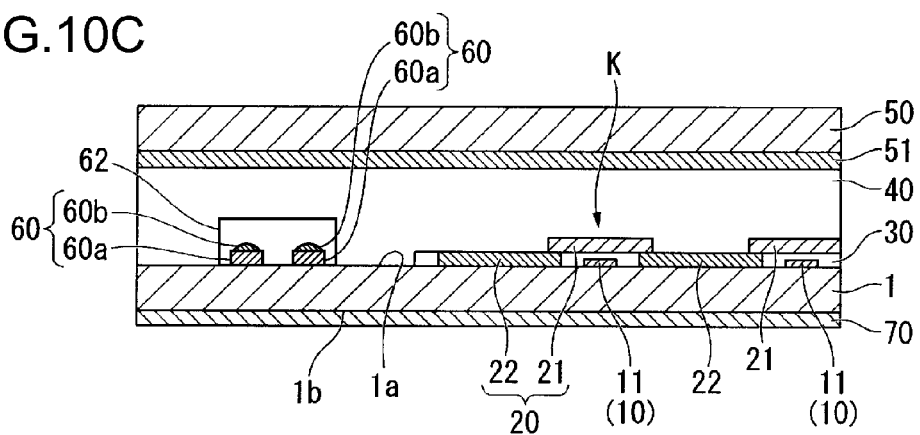

The procedure then proceeds to the shield layer formation step S80. In the shield layer formation step S80, the shield layer 70 formed of a conductive film is formed on the other surface 1b (the surface opposite to the one surface 1a) of the glass substrate 1, as shown in FIG. 10C. The shield layer 70 can be formed by using vacuum deposition, screen printing, offset printing, droplet discharging, or any other known deposition method. For example, when the shield layer 70 is formed by using droplet discharging or any other suitable printing method, the liquid material containing, for example, ITO particles used in the electrode deposition step S10 and the bridge wiring line formation step S50 can be used. Instead of forming the shield layer 70 by depositing a material on the glass substrate 1, a film having a conductive film deposited on one side or both sides thereof may be separately prepared, and the film may be bonded to the other surface 1b of the glass substrate 1. In this case, the conductive film on the film serves as the shield layer 70.

In the present embodiment, the shield layer 70 is formed in the last step in the touch panel manufacturing procedure. The shield layer 70 can alternatively be formed at an arbitrary timing. For example, the glass substrate 1 on which the shield layer 70 has been formed in advance can be used in the electrode deposition step S10 and afterward. Alternatively, the shield layer formation step may be carried out at an arbitrary point between the electrode deposition step S10 and the protective substrate joint step S70.

In the present embodiment, the shield layer 70 is formed on the other surface 1b of the glass substrate 1. When a shield layer 70A is alternatively formed on the one surface 1a of the glass substrate 1, the step of forming the shield layer 70A and the step of forming an insulating film are carried out before the electrode deposition step S10. In this case as well, the shield layer 70A can be formed by using the same procedure as that in the shield layer formation step S80. The step of forming an insulating film can, for example, be the insulating film formation step S30.

Configuration of Electro-Optical Device

Figure 14A:
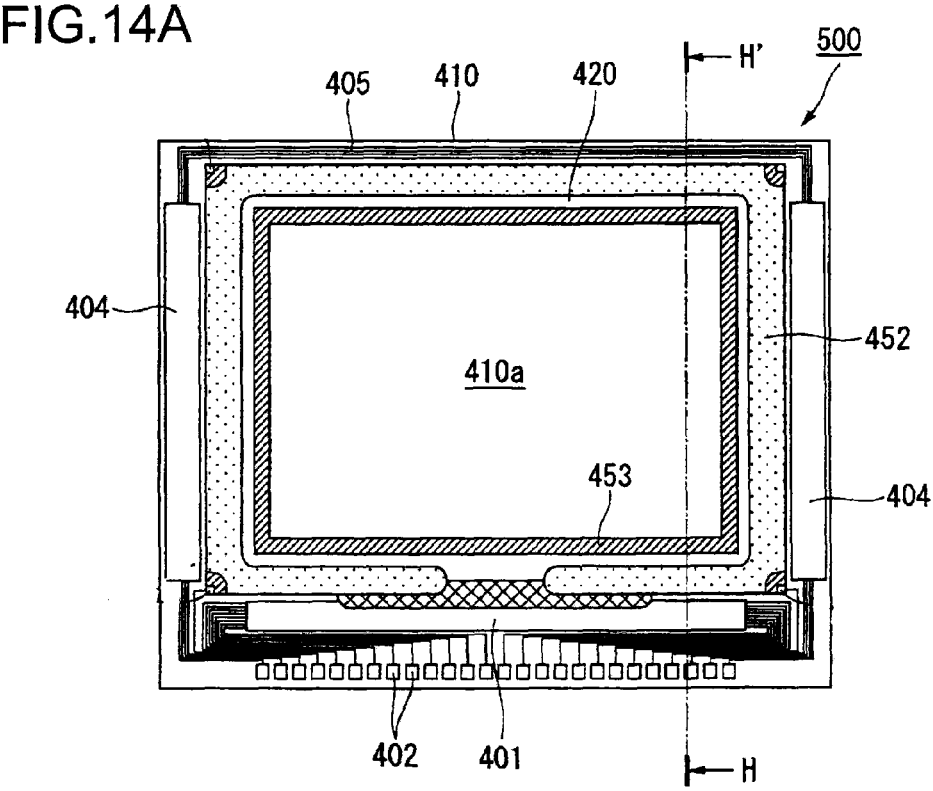
FIGS. 14A and 14B are a plan view and a cross-sectional view, respectively, showing the configuration of a liquid crystal display device as an electro-optical device.
Figure 14B:
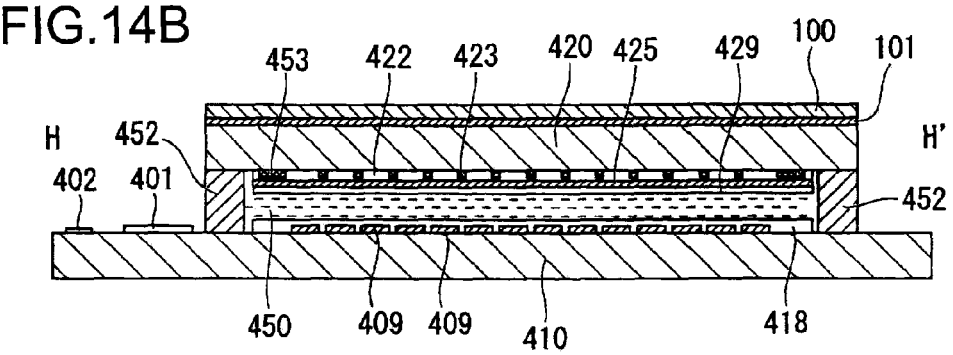

The configuration of an electro-optical device will next be described. In the present embodiment, the electro-optical device is a liquid crystal display device, and the configuration of a liquid crystal display device including the touch panel 100 described above will be described. FIGS. 14A and 14B show the configuration of the liquid crystal display device. FIG. 14A is a plan view, and FIG. 14B is a cross-sectional view taken along the line H-H' in the plan view of FIG. 14A.

As shown in FIG. 14A, a liquid crystal display device 500 includes an element substrate 410, a counter substrate 420, and an image display area 410a. The element substrate 410 is a rectangular substrate having a flat area larger than that of the counter substrate 420. The counter substrate 420 is a transparent substrate made, for example, of glass or an acrylic resin and located on the image display side in the liquid crystal display device 500. The counter substrate 420 is joined to a central portion of the element substrate 410 via a seal member 452. The image display area 410a is a flat area that is part of the counter substrate 420 and located inside a periphery parting portion 453 provided along the inner circumference of the seal member 452.

On the element substrate 410 but around the counter substrate 420 are disposed a data line drive circuit 401, scan line drive circuits 404, connection terminals 402 connected to the data line drive circuit 401 and the scan line drive circuits 404, wiring lines 405 that connect the scan line drive circuits 404 disposed on opposite sides of the counter substrate 420, and other components.

A cross section of the liquid crystal display device 500 will next be described. Pixel electrodes 409, an orientation film 418, and other components are stacked on one side of the element substrate 410 where a liquid crystal layer 450 is present. A light blocking film (black matrix) 423, color filters 422, a common electrode 425, an orientation film 429, and other components are stacked on one side of the counter substrate 420 where the liquid crystal layer 450 is present. The liquid crystal layer 450 is sandwiched between the element substrate 410 and the counter substrate 420. The touch panel 100 according to the invention is disposed on the outer side (opposite to the liquid crystal layer 450) of the counter substrate 420 via an adhesive layer 101.

Configuration of Electronic Apparatus

Figure 15:
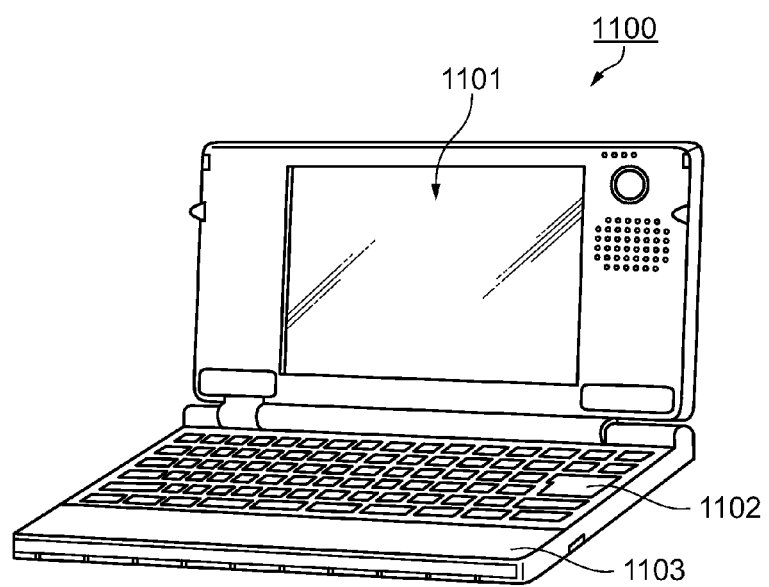
FIG. 15 is a perspective view showing the configuration of a personal computer as an electronic apparatus.

The configuration of an electronic apparatus will next be described. In the present embodiment, the electronic apparatus is a mobile personal computer, and a description will be made of the configuration of a mobile personal computer in which the touch panel or the liquid crystal display device including the touch panel described above is incorporated. FIG. 15 is a perspective view showing the configuration of the mobile personal computer. The mobile personal computer 1100 includes a display section 1101 and a body section 1103 including a keyboard 1102. The display section 1101 of the mobile personal computer 1100 includes the liquid crystal display device 500 of the embodiment described above.

According to the thus configured mobile personal computer 1100, the electronic apparatus can be manufactured at a low cost because the touch panel according to the invention is used as the display section.

The electronic apparatus described above is presented by way of example of the electronic apparatus according to the invention but does not limit the technical scope of the invention. For example, the touch panel according to the invention can also be preferably used as the display section of a mobile phone, a mobile audio apparatus, a PDA (Personal Digital Assistant), and other apparatus.

A preferred embodiment according to the invention has been described with reference to the accompanying drawings, but the invention is, of course, not limited thereto. The shapes, combinations, and other factors of the constituent members shown in the embodiment described above are presented by way of example, and a variety of changes can be made thereto based on, for example, design requirements to the extent that the changes do not depart from the substance of the invention.

According to the embodiment described above, the following advantages are provided:

1. Each of the first conductive films 60a has the corresponding second conductive film 60b provided thereon, which has the width W2 narrower than the width W1 of the first conductive film 60a. Further, the second conductive film 60b has a convexly curved surface. Forming the stacked structure described above allows the second conductive film 60b to have a shape that does not come into contact with the glass substrate 1 or overlap with both ends of the first conductive film 60a, whereby the occurrence of film separation or other defects due to stress or other reasons will be suppressed. Further, the occurrence of cracks or other defects due to stress or other reasons will be suppressed.

2. Each of the second conductive films 60b has a thickness ranging from 0.2 to 2 µm and an end angle in a cross-sectional view ranging from 0.5 to 10 degrees. The thus configured second conductive film 60b suppresses film separation, cracking, and other defects and can hence provide a reliable touch panel. Further, in relation to the first protective films 61, which cover the first and second conductive films 60a, 60b, when the first protective films 61 are formed, for example, by using photolithography, the amount of irregular reflection (halation) that occurs on the second conductive films 60b is reduced in a light exposure process. The resultant touch panel 100 can therefore have a precise stacked pattern.

3. The base member 1' formed of the glass substrate 1 on which the first conductive films 60a are formed undergoes surface treatment using the hexamethyldisilazane 910. In the surface treatment, the hexamethyldisilazane 910 reacts with water on the surface of the glass substrate 1, and the surface of the glass substrate 1 is coated with trimethylsilyl. That is, the surface of the glass substrate 1 has undergone a water repellency treatment. On the other hand, since the surfaces of the first conductive films 60a slowly react with the hexamethyldisilazane 910, the resultant first conductive films 60a exhibit low water repellency. That is, the surfaces of the first conductive films 60a are kept hydrophilic. Performing the surface treatment described above allows a water repellent area and a hydrophilic area to be formed simultaneously and selectively. As a result, the manufacturing procedure can be simplified. A functional liquid containing an aqueous carrier medium in which the material of the second conductive films 60b is dispersed is then discharged in the form of droplets toward the first conductive films 60a, and applied onto the first conductive films 60a. Since the surfaces of the first conductive films 60a exhibit low water repellency (hydrophilicity), the applied functional liquid wets and spreads over the first conductive films 60a. On the other hand, since the surface of the glass substrate 1 exhibits water repellency, the functional liquid is constrained not to wet or spread over the glass substrate 1. As a result, the functional liquid can wet and spread over the first conductive films 60a and follow the shape of the pattern thereof. The functional liquid can then be solidified to form the second conductive films 60b, the width W2 of each of which is narrower than the width W1 of the corresponding first conductive film 60a, on the first conductive films 60a. The second conductive films 60b can thus be formed more precisely than a patterned film formed by using photolithography. In this way, fine conductive films can be formed.

The invention is not limited to the embodiment described above, but the following variation can be implemented.

Variation 1

The above embodiment has been described with reference to the touch panel 100 as the conductive film stacked member, but the invention is not limited thereto. For example, the invention may alternatively be applied to a liquid crystal display, a plasma display, an organic EL display, an FED (Field Emission Display) plasma display, and other displays. In these cases as well, the same advantage described above can be provided.

What is claimed is:

1. A conductive film stacked member comprising:
   a first conductive film formed on a substrate, the first conductive film having an upper surface disposed between a pair of side surfaces that extend toward the substrate;
   a second conductive film formed on the upper surface of the first conductive film; and
   a protective film disposed directly on the second conductive film,
   wherein the width of the second conductive film is narrower than the width of the upper surface of the first conductive film,
   the second conductive film has a convex surface in a cross-sectional view; and
   the protective film directly contacts the upper surface of the first conductive film.

2. The conductive film stacked member according to claim 1,
   wherein the width of the second conductive film is narrower than the width of the upper surface in such a way that both ends of the second conductive film are spaced apart from the side surfaces of the first conductive film in the width direction by 0.5 to 5 μm.

3. The conductive film stacked member according to claim 1,
   wherein the thickness of the second conductive film ranges from 0.2 to 2 μm, and
   an angle of inclination of an end of the convex surface of the second conductive film relative to the upper surface in a cross-sectional view ranges from 0.5 to 10 degrees.

4. The conductive film stacked member according to claim 1,
   wherein the first conductive film is a conductive film having transparency, and
   the second conductive film is a conductive film containing silver.

5. The conductive film stacked member according to claim 1,
   wherein the conductive film stacked member is formed of a three-layer stacked portion in which the first conductive film, the second conductive film formed on the first conductive film, and the protective film formed on the second conductive film are stacked, and
   a two-layer stacked portion in which the first conductive film and the protective film formed on the first conductive film are stacked and which is located at each end in the width direction of the first conductive film.

6. The conductive film stacked member according to claim 5,
   wherein the first conductive film and the protective film are made of the same material.

7. The conductive film stacked member according to claim 1,
   wherein the second conductive film is formed by carrying out a water repellency treatment on the surface of the substrate, carrying out a weak water repellency treatment that provides water repellency weaker than that of the substrate on the surface of the first conductive film, and applying a liquid material containing the material of the second conductive film onto the first conductive film.

8. An electro-optical device comprising the conductive film stacked member according to claim 1.

9. An electronic apparatus comprising the electro-optical device according to claim 8.

* * * * *